United States Patent [19]

Henke et al.

[11] Patent Number: 4,484,355
[45] Date of Patent: Nov. 20, 1984

[54] HANDHELD TRANSCEIVER WITH FREQUENCY SYNTHESIZER AND SUB-AUDIBLE TONE SQUELCH SYSTEM

[75] Inventors: Steven P. Henke; Robert N. Fields, both of Indianapolis, Ind.

[73] Assignee: Ritron, Inc., Carmel, Ind.

[21] Appl. No.: 484,045

[22] Filed: Apr. 11, 1983

[51] Int. Cl.³ .............................................. H04B 1/40
[52] U.S. Cl. ...................................... 455/76; 455/35; 455/77
[58] Field of Search .................... 455/31, 35, 36, 38, 455/76, 77; 179/2 DP; 340/825.48

[56] References Cited

U.S. PATENT DOCUMENTS

| | | | |
|---|---|---|---|
| 3,597,690 | 9/1967 | Wycoff | 455/38 |
| 4,142,158 | 2/1979 | Belisomi | 455/183 |
| 4,216,545 | 8/1980 | Flickshu et al. | 455/77 |
| 4,249,165 | 3/1981 | Mori | 340/825.44 |
| 4,254,504 | 3/1981 | Lewis et al. | 455/76 |
| 4,320,522 | 3/1982 | Hayes | 179/2 DP |
| 4,409,687 | 10/1983 | Berti et al. | 455/35 |

OTHER PUBLICATIONS

Owner's Manual and Service Manual on Wilson Model No. WH-2510 Radio, 7/81.

*Primary Examiner*—Jin F. Ng
*Attorney, Agent, or Firm*—Woodard, Weikart, Emhardt & Naughton

[57] ABSTRACT

A handheld transceiver providing separate selective communications links for transmission and reception on a single carrier frequency by means of independent carrier and sub-audible tone frequencies in transmit and receive modes. A carrier frequency synthesizer functions as a local oscillator and direct FM modulator, and a Continuous Tone-Coded Squelch System (CTCSS) generates and detects sub-audible tones that are transmitted simultaneously with voice information on a carrier wave. The carrier frequency synthesizer and the CTCSS tone detector/generator operate at frequencies independently determined by data stored in a programmable read only memory such that each channel can be programmed to have a unique carrier and CTCSS tone frequency in both transmit and receive modes.

24 Claims, 11 Drawing Figures

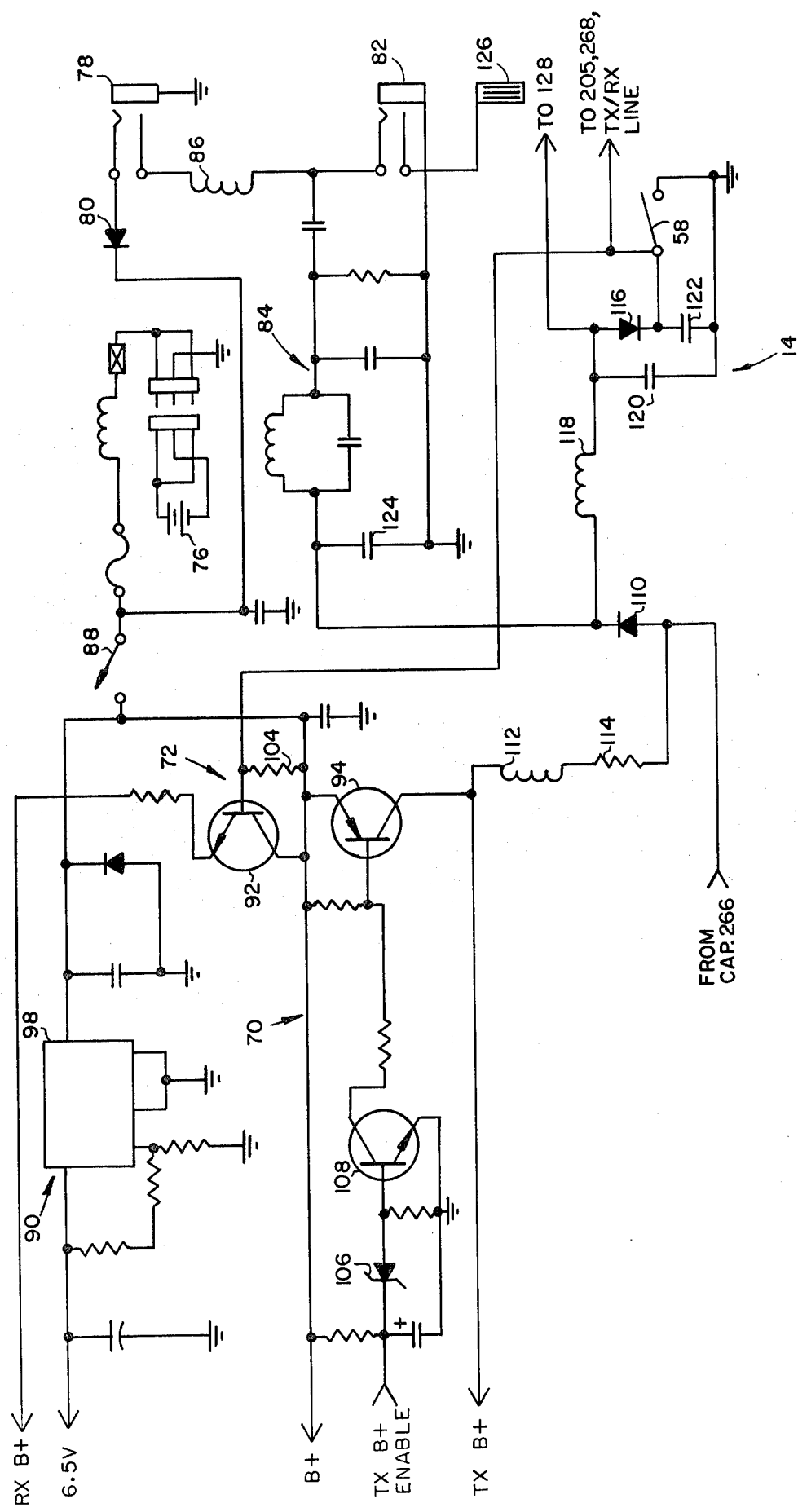

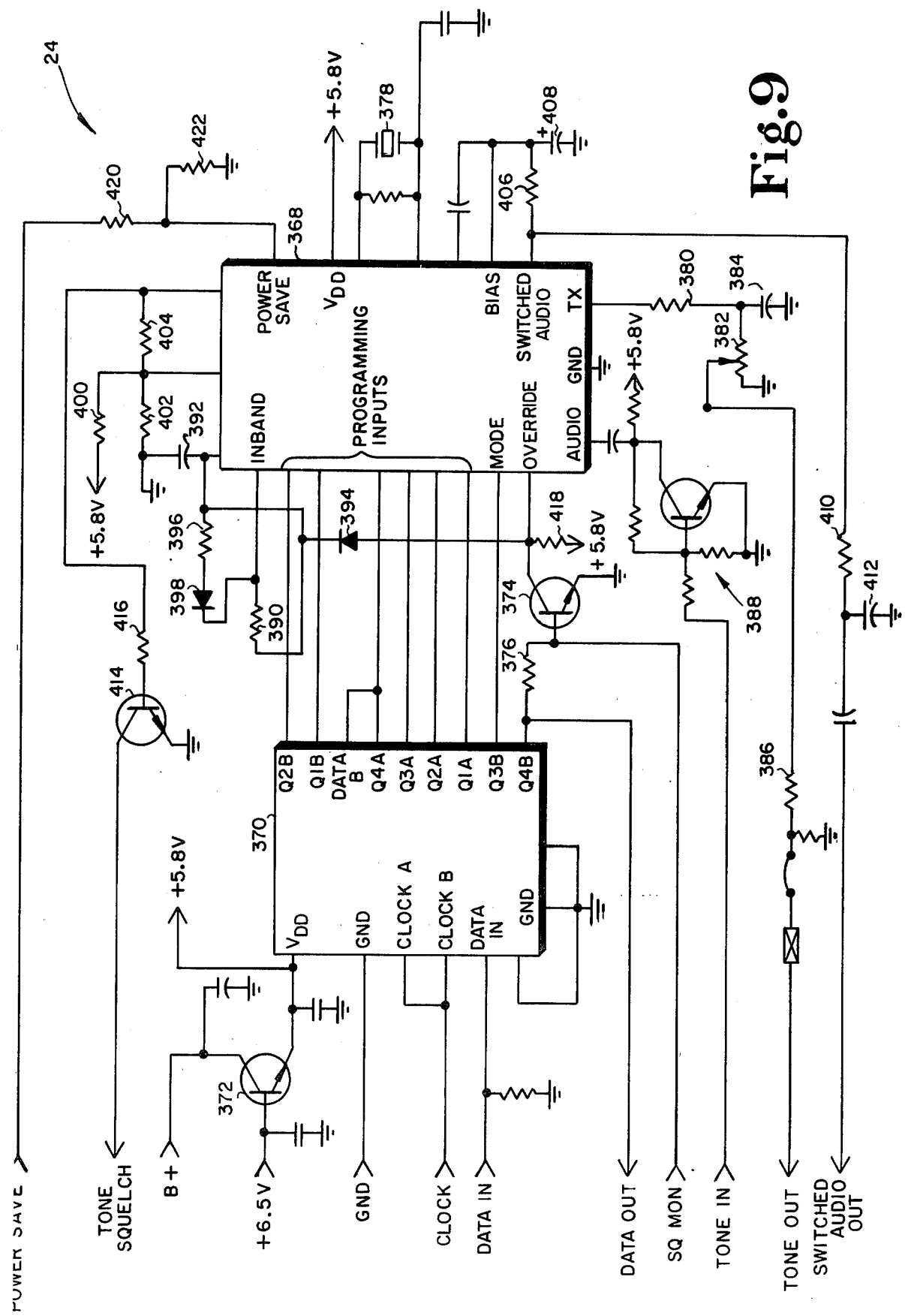

HANDHELD TRANSCEIVER WITH FREQUENCY SYNTHESIZER AND SUB-AUDIBLE TONE SQUELCH SYSTEM

BACKGROUND OF THE INVENTION

This invention relates to electronically tuned radio transceivers and particularly to transceivers using a frequency synthesizer with coded channel frequency information stored in a memory.

Handheld radio transceivers have existed for some time, the early models using electromechanical tuning devices to select the frequency of operation. Electronically tuned receivers were subsequently developed which incorporated multiple local oscillator circuits each having a crystal of a desired frequency whereby the operator could tune to a selected frequency by switching in the corresponding crystal. The phase-locked loop frequency synthesizer has afforded a precision of tuning not previously obtainable due to the vulnerability of electromechanical devices to thermal drift and other causes of error. The use of completely electronic devices including, in many cases, large-scale integrated circuits, has brought about greater reliability, smaller size and lower cost.

Current transceivers have multiple channel operation and thereby provide some measure of selectivity of communication. However, the number of communication channels available is necessarily limited by the number of frequencies alotted for use by the Federal Communications Commission (FCC).

U.S. Pat. No. 4,245,504 to Lewis et al discloses a transceiver with a frequency synthesizer controlled by channel frequency codes contained in a programmable read only memory (PROM), with a channel switch for addressing the memory and thereby selecting the channel frequency. This apparatus is not capable of selective communication on a single carrier frequency. Any transmission is received by all users who are tuned to the frequency of the transmission whether it is intended for them or not.

Selective transmission of intelligence is possible on a single carrier frequency by using a tone control circuit having a frequency-controllable filter, as shown, for example, in U.S. Pat. No. 3,597.690 to Wycoff. That apparatus uses switches connected to tapped inductors to detect selected tone frequencies. However, the number of available tone frequencies is severely limited, as a practical matter, by the number of taps possible on a tapped inductor. Moreover, the Wycoff apparatus has no provision for more than one carrier frequency. nor does it provide for changing to a different tone frequency in conjunction with a change of carrier frequency.

A two-way radio using a frequency synthesizer and storing carrier and tone frequency data in an electrically alterable read only memory (EAROM) is manufactured by the Wilson Division of Regency Electronics, Inc. and designated model WH 2510. Separate channels of this radio may be programmed for different carrier and tone frequencies with each channel having different transmit and receive mode carrier frequencies and a common tone frequency for both transmission and reception.

Transceivers such as those described above have limitations where, for example, they are used for multiple communication purposes on the premises of factories, construction sites, warehouses and other facilities. Because such communications networks typically employ more than two radios on one frequency, users are frequently disturbed by unwanted calls. Selective communication is not readily available, however, without assigning separate carrier frequencies to individual personnel or resorting to more complex and expensive selective signalling techniques. Except for low-power industrial frequencies, business and industrial users are not able to assign separate carrier frequencies because such users are limited by the FCC to transmission on one carrier frequency. Although multiple frequency assignments can be made on certain frequencies set aside by the FCC for low-power business and industrial communications, this technique increases the likelihood of interference and is impractical in repeater applications. Moreover, programming of tone frequencies in radios such as the Wilson radio only provides a limited degree of selective communication.

Another limitation of radios such as the Wilson radio concerns their use with repeaters. Repeaters, which transmit and receive on separate carrier frequencies, are susceptible to unauthorized utilization. A repeater's transmit carrier frequency is readily determined with the aid of a scanning receiver, and since the receive and transmit frequencies of a repeater are commonly separated by a fixed difference frequency, the repeater's receive frequency is easily calculable. The frequency of the tone transmitted by the repeater can also be measured with relatively simple equipment. With this information, anyone desiring to do so can activate and use the repeater without authorization. Unauthorized access can have costly consequences inasmuch as many repeaters function as interconnections to phone lines or computers. Such unauthorized access can be made more difficult by using independent tone frequencies for transmission and reception. However, transceivers which have a common tone frequency for transmission and reception on given channels would not be operable in such a communication system.

SUMMARY OF THE INVENTION

While the actual scope of the invention covered herein can be determined only by reference to the claims appended hereto, certain of the features which are relevant to the improved operation of the novel transceiver disclosed herein can be described briefly. In the preferred embodiment, a phase-locked loop (PLL) carrier frequency synthesizer functions as a local oscillator and direct FM modulator, and a Continuous Tone-Coded Squelch System (CTCSS) generates and detects sub-audible tones that are transmitted simultaneously with voice information on a carrier wave. The transceiver has the ability to transmit and receive independent CTCSS tone frequencies determined by data stored in a PROM. A carrier frequency synthesizer data word and a tone encoder/decoder data word are stored in the PROM for each channel and each mode. Therefore, each channel can be programmed to have a unique carrier and CTCSS tone frequency in both transmit and receive modes. New data is read out of the PROM each time a new channel is selected or the talk switch is pressed or released. Control circuitry is provided which determines from the position of these switches which bank of the PROM is addressed. The control circuitry also causes the data to be serially read out and supplied to shift registers contained within the tone encoder/decoder and the PLL frequency synthesizer. At the end of a read cycle, the tone encoder/decoder contains one portion of the data and the PLL frequency synthesizer contains a second portion.

Transceivers according to the present invention provide selective signalling on a single carrier frequency whereby an intended recipient can be contacted even if he is not currently tuned to the caller's channel. If the transceivers are used in a network having a base station and several remote units, for example, one channel of the base station unit can be programmed for each remote unit, each channel having a unique tone for transmit mode and a common tone for receive mode. One channel of each remote unit may then be correspondingly programmed to transmit the common tone and receive a unique tone. The base station can thus directly contact any remote unit by transmitting on the channel corresponding to that unit, and any remote unit can directly contact the base station by transmitting on its channel corresponding to the base station, regardless of which channel is selected in the base station at that time. Similarly, selective signalling between any two transceivers in a network can be accomplished by assigning each a unique tone frequency, programming each to receive its tone frequency on as many channels as there are other transceivers in the network, and programming the transmit frequencies of those channels with the assigned tone frequencies of the other transceivers. Each party hears any call intended for him regardless of which transceiver channel he has selected, and he can then select the caller's channel to talk back.

Transceivers according to the present invention also provide increased protection from unauthorized access to repeaters when they are used to construct a communication system which utilizes independent tone frequencies for transmission and reception. In such a system, the access tone for the repeaters cannot be simply determined, and the security of the system is thereby enhanced. Furthermore, there is also provided the ability to store transmit and receive tone frequencies for several different repeaters without the need for separate tone detector/generators which are individually prohibitively large for handheld transceiver applications. Moreover, the ability to program a transceiver for transmission and reception of independent carrier and tone frequencies, or for reception of transmissions not having a tone, enables a single transceiver to provide two-way communication with repeaters and other transceivers as well as reception of signals which do not carry sub-audio tone signals, such as signals on public safety bands.

BRIEF DESCRIPTION OF THE DRAWINGS

FIG. 2 is a schematic diagram of a portion of FIG. 1 and includes the antenna switch, TX B+ control circuit and RX B+ control circuit. Also shown in FIG. 2 is power supply circuitry for the transceiver of FIG. 1.

FIG. 9 is a schematic diagram of a portion of FIG. 1 and includes the tone encoder/decoder.

DESCRIPTION OF THE PREFERRED EMBODIMENT

Figure 1:
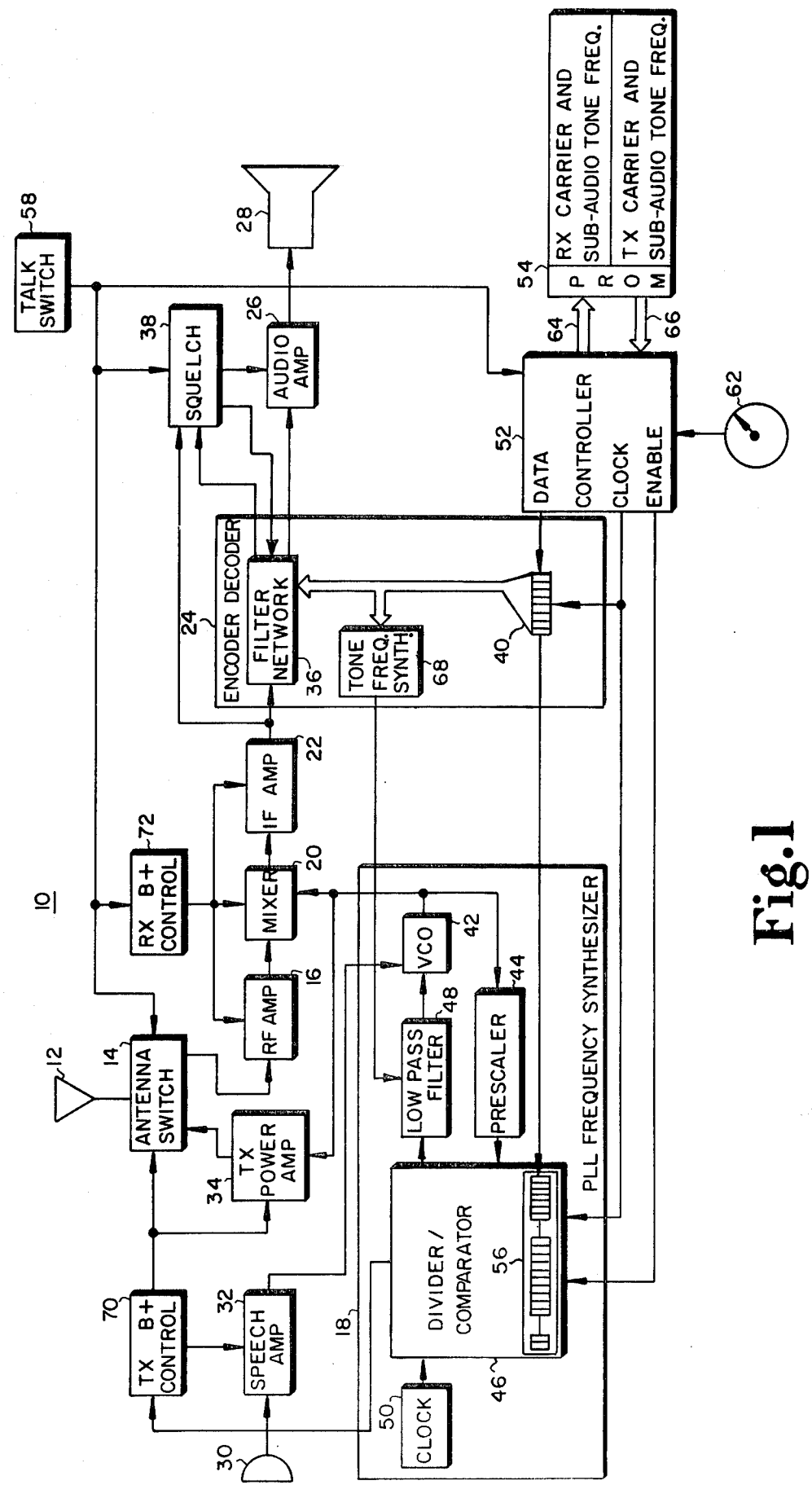
FIG. 1 is a block diagram of a transceiver according to the invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The general operation of the transceiver of the present invention will be described with reference to FIG. 1, which shows the transceiver in block diagram form. The transceiver, generally designated at 10, has a receiver section including antenna 12, antenna switch 14, radio-frequency (RF) amplifier 16, phase-locked loop (PLL) frequency synthesizer 18, mixer 20, intermediate-frequency (IF) amplifier 22, tone encoder/decoder 24, audio amplifier 26, and speaker 28. The transmitter portion of transceiver 10 includes microphone 30, speech amplifier 32, PLL frequency synthesizer 18, transmitter power amplifier 34, antenna switch 14 and antenna 12.

In receive mode operation, RF signals received on antenna 12 pass through antenna switch 14 to RF amplifier 16 which amplifies signals at frequencies within a selected portion of the VHF High band (144 to 174 MHz). It will be understood by those skilled in the art that other bands, for example, the UHF Band or the VHF Low Band, may be desired for certain applications and that corresponding component values may be determined, as for the VHF High Band, using a number of well known techniques. Frequency synthesizer 18, which will be described more fully hereinafter, functions as a first local oscillator for mixer 20, producing a signal which is either 10.7 MHz above or below the frequency desired for reception. Mixer 20 receives the RF signal output from RF amplifier 16 and the local oscillator signal from frequency synthesizer 18 and produces a number of frequencies, including, if a signal is received on the selected channel, a difference frequency component at 10.7 MHz. IF amplifier 22, which includes filter, mixer and FM detector stages, recovers voice and sub-audio tone information from the 10.7 MHz signal.

The demodulated output signal from IF amplifier 22 is fed into programmable filter network 36 of tone encoder/decoder 24 and to squelch circuit 38. As will be described later, filter network 36 is normally in a standby condition. Squelch circuit 38 monitors the demodulated signal for noise, and if no noise is detected, as in the case of a received carrier signal, squelch circuit 38 sends a control signal to encoder/decoder 24 which enables filter network 36. Filter network 36 is programmed by the contents of shift register 40 to respond during receive mode to the presence of a sub-audio tone at a desired frequency. If a sub-audio tone is detected at the desired frequency, filter network 36 outputs the audio portion of the signal to audio amplifier 26 and sends a control signal to squelch circuit 38 to open the squelch. Squelch circuit 38 then couples supply current to audio amplifier 26, and audio amplifier 26 amplifies the audio signal and feeds it to speaker 28 for reception by a listener.

PLL frequency synthesizer 18, consisting of voltage-controlled oscillator (VCO) 42, prescaler 44, divider/-comparator 46, low pass filter 48 and reference crystal oscillator 50, and operating in conjunction with controller 52 and PROM 54, generates the first local oscillator signal for the receiver. Data supplied from PROM 54 to shift register 56 by controller 52 determines the frequency of the output of VCO 42. Controller 52 controls the transfer of data by generating a series of address words in response to commands from TALK switch 58 and CHANNEL SELECT switch 62 and transferring those address words to PROM 54 on address lines 64. PROM 54 responds by outputting data in parallel fashion on data lines 66. Controller 52 couples a selected data line from data lines 66 to the DATA output of controller 52. The resulting data stream is shifted from the DATA output of controller 52 through tone frequency shift register 40 to carrier frequency shift register 56 under control of a CLOCK signal generated by controller 52. The CLOCK signal is supplied to decoder/encoder 24 and divider/comparator 46 through the CLOCK output of controller 52. At the end of a read cycle carrier frequency shift register 56 contains the portion of data which corresponds to the selected carrier frequency, and tone freguency shift register 40 contains the data portion corresponding to the selected sub-audio tone signal frequency.

When TALK switch 58 is depressed, controller 52 reads out data corresponding to a transmit mode carrier frequency and sub-audio tone signal frequency. In that instance, tone frequency synthesizer 68 in tone encoder/decoder 24 generates a tone at a frequency corresponding to the data in shift register 40. The tone signal output of tone encoder/decoder 24 is coupled to low pass filter 48 during transmit mode, as will be described.

The transmitter portion of transceiver 10 will now be described with continuing reference to FIG. 1. Speech amplifier 32 amplifies and limits the voice signal received from microphone element 30 and filters out signals above the voice frequency range. The signal output of speech amplifier 32 is fed to VCO 42 as a modulation voltage. As already stated, the tone signal output of tone encoder/decoder 24 is applied to an input of low pass filter 48. The bandwidth of the phase-locked loop is narrow enough to prevent the loop from responding to sub-audio frequency components, thus allowing VCO 42 to deviate in frequency. Frequency synthesizer 18 thus functions as a modulator providing direct FM. The output signal from VCO 42 is amplified in transmitter power amplifier 34 and coupled to antenna switch 14 which couples the signal to antenna 12 for transmission.

Antenna switch 14 is set for either transmission or reception depending on the position of TALK switch 58 and the state of transmitter power supply (TX B+) control circuit 70. When TALK switch 58 is in the transmit mode position and TX B+ control circuit 70 is enabled for supplying current to antenna switch 14, antenna switch 14 is tuned to pass output power to antenna 12 and to prevent coupling of output power to RF amplifier 16. In this position, TALK switch 58 disables receiver power supply (RX B+) control circuit 72, thereby removing B+ power from RF amplifier 16, mixer 20 and IF amplifier 22. TALK switch 58 also sends a disable signal to squelch circuit 38, which responds by removing B+ power from audio amplifier 26. Thus the receiver is inoperative in transmit mode. TALK switch 58 indirectly controls TX B+ control circuit 70. applying a command to controller 52 which causes transfer of transmit mode frequency data from PROM 54 through controller 52 and shift register 40 to shift register 56 of frequency synthesizer 18. If the PLL locks on the desired frequency, divider/comparator 46 sends an enable signal to TX B+ control circuit 70 causing it to apply B+ power to transmitter power amplifier 34 and antenna switch 14.

When TALK switch 58 is in the receive mode position, TX B+ control circuit 70 receives a disable signal from divider/comparator 46 regardless of whether the PLL has locked up. In this mode, antenna switch 14 is tuned to pass input signals from antenna 12 to RF amplifier 16 and to decouple transmitter power amplifier 34 from antenna 12. RF amplifier 16, mixer 20 and IF amplifier 22 are connected to B+ power through RX B+ control circuit 72, and audio amplifier 26 is connected to B+ power if the other squelch-related conditions, already described, are satisfied.

FIG. 2 is a schematic representation of antenna switch 14, RX and TX B+ control circuits 72 and 70 and TALK switch 58 shown in block diagram form in FIG. 1, along with associated circuitry. The primary power source for the transceiver is battery 76 which consists of seven 800 milliampere-hour "A/" rechargeable nickel-cadmium batteries connected in series to provide a nominal supply voltage of 8.4 volts DC. Battery 76 may be recharged by turning the transceiver off and connecting charger jack 78 to a commercially available battery charger adapted for connection to a 110 volts AC wall outlet. When a battery charger is not connected, the anode of diode 80 is connected to test jack 82 and elliptic filter 84 through charger jack 78 and inductor 86.

Figure 4:
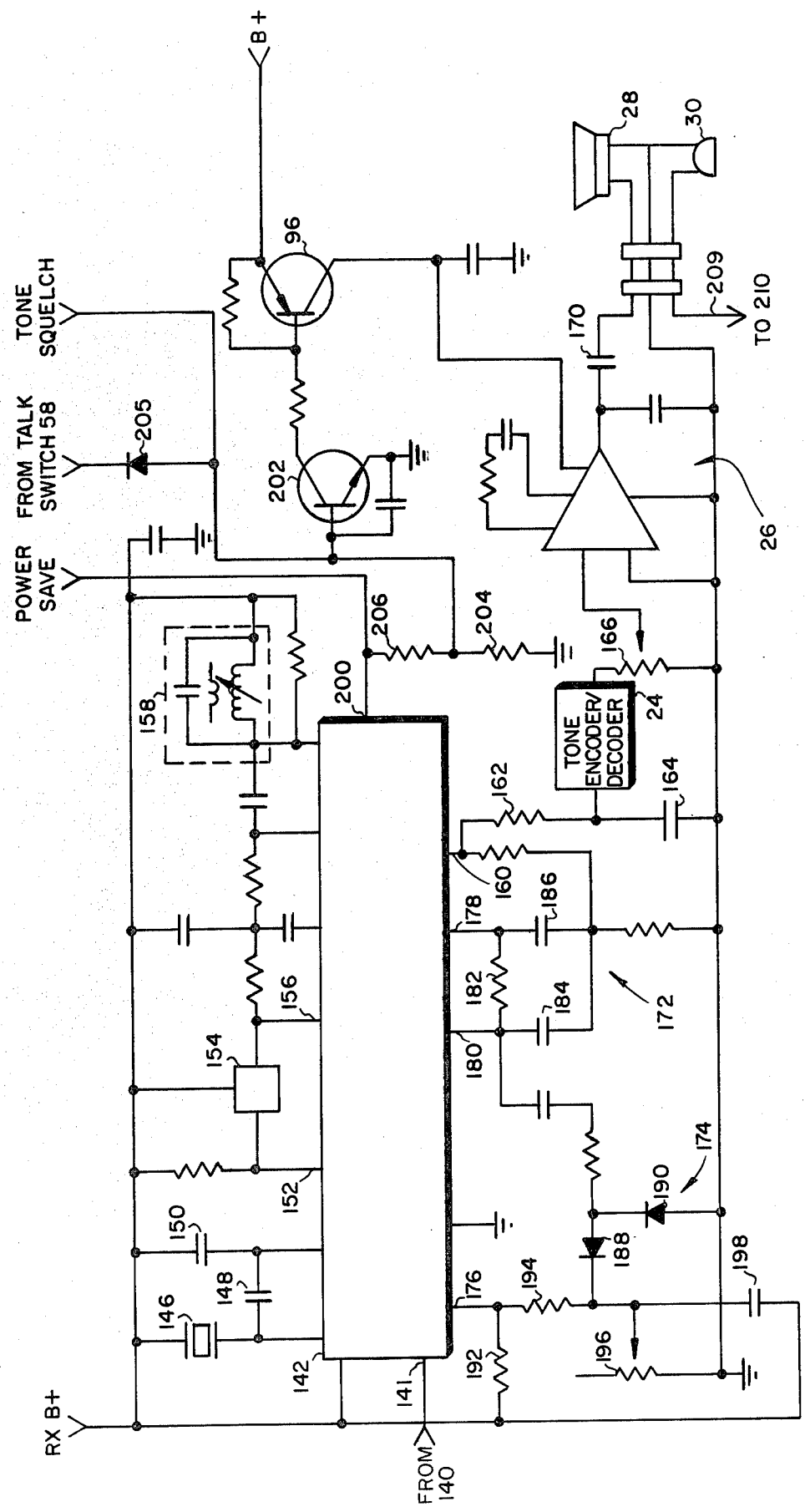
FIG. 4 is a schematic diagram of a portion of FIG. 1 and includes the IF amplifier, squelch circuit, audio amplifier, speaker and microphone.

When ON/OFF switch 88 is switched into the ON position, the supply voltage from battery 76 is applied to voltage regulator 90, RX B+ control transistor 92, and TX B+ control transistor 94, and is also coupled on the B+ line to the B+ inputs of FIGS. 4 and 9. Voltage regulator 90, consisting of integrated circuit 98 (National Semiconductor LM2931CT) and associated circuitry, produces a regulated output voltage of 6.5 volts DC for freguency synthesizer 18 tone encoder/decoder 24, controller 52 and PROM 54 shown in FIG. 1.

RX B+ control transistor 92 is controlled by TALK switch 58, a normally open single-pole, single-throw (SPST) momentary switch. When TALK switch 58 is depressed for transmission, the base of transistor 92 is pulled to ground through switch 58 thereby cutting off transistor 92 and disconnecting RF amplifier 16, mixer 20 and IF amplifier 22 (FIG. 1) from the supply voltage. When TALK switch 58 is released, transistor 92 receives base current from battery 76 through resistor 104 which causes transistor 92 to conduct. Transistor 92 acts as a voltage follower to supply voltage to RF amplifier 16, mixer 20 and IF amplifier 22.

As stated previously, TALK switch 58 indirectly controls TX B+ control circuit 70. In receive mode, as will be described later, the TX B+ ENABLE line is held at a logical zero (LOW) level by a LOW output signal from divider/comparator 46 (FIG. 1) causing zener diode 106 to be reverse biased whereby transistor 108 turns OFF. With transistor 108 OFF, no base current can flow out of TX B+ control transistor 94 so transistor 94 turns OFF. As will be explained with reference to FIG. 6, the TX B+ ENABLE line is LOW unless the transceiver is in transmit mode and the phase-locked loop is locked. In that situation, transistors 108 and 94 are both ON whereby transmitter power amplifier 34 (FIG. 1) receives B+ power. and PIN diode 110 of antenna switch 14 receives bias current through inductor 112 and resistor 114 rendering it conductive.

TALK switch 58 also controls antenna switch 14 consisting of PIN diodes 110 and 116, inductor 118 and capacitors 120, 122 and 124 connected as shown in FIG. 2. When TALK switch 58 is released, the voltage at the cathode of PIN diode 116 is approximately 7 to 8 volts DC, causing that diode to be reverse biased. As has been described, TX B+ control transistor 94 is OFF in receive mode, thus PIN diode 110 is also reverse biased. With PIN diodes 110 and 116 reverse biased, signals received on antenna jack 126 from antenna 12 shown in FIG. 1 pass through test jack 82, elliptic filter 84 and inductor 118 of antenna switch 14, the input of a two-pole bandpass filter circuits 128 and 130 of FIG 3.

Figure 3:
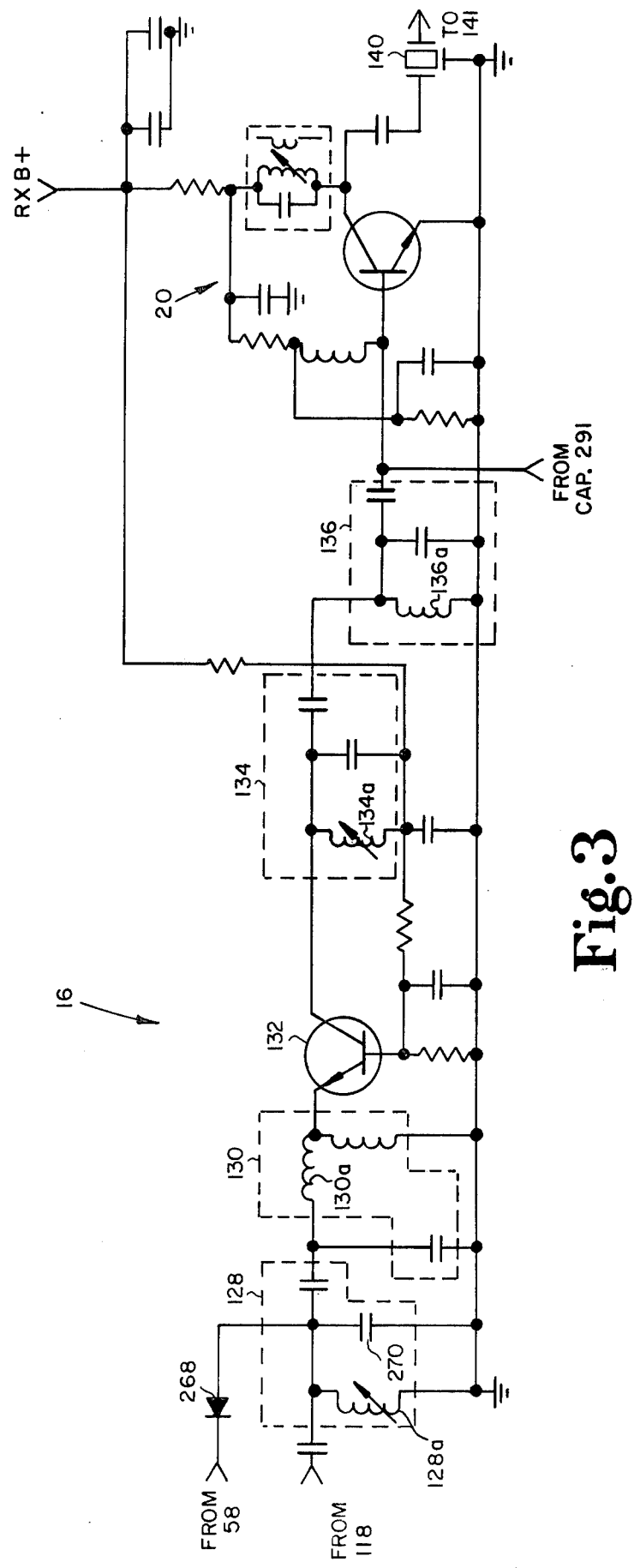
FIG. 3 is a schematic diagram of a portion of FIG. 1 and includes the RF amplifier and mixer.

Referring now to FIG. 3, the output signal from bandpass filter circuit 130 is fed to the emitter of common-base RF transistor amplifier 132. RF amplifier 132 couples the amplified signal to a second two-pole bandpass filter 134 and 136. Bandpass filter circuits 128, 130, 134 and 136 are designed to pass signals within a predetermined 8 MHz portion of the frequency range of 144 to 174 MHz. The particular passband is determined by variable inductors 128a, 130a, 134a, and 136a. Mixer 20 receives the output of filter circuit 136, consisting of all received signals within this RF range, as well as the output signal from frequency synthesizer 18 (FIG. 1) which, as has been stated, is either 10.7 MHz above or below the frequency desired for reception. Mixer 20 produces a number of frequencies for each input signal, including the input frequency, twice the input frequency, and the sum and difference of the input frequency with every other input frequency. Two-pole monolithic crystal filter 140, which has a center frequency of 10.7 MHz, attenuates all frequencies produced by mixer 138 except for any difference frequency component at the first IF frequency of 10.7 MHz, which component corresponds to a signal on the desired channel. The 10.7 MHz first IF signal is coupled to input 141 of integrated circuit 142 shown in FIG. 4.

IF amplifier 22, audio amplifier 26, and squelch circuit 38, shown in block diagram form in FIG. 1, are shown schematically in FIG. 4. Portions of the circuitry of IF amplifier 22 and squelch circuit 38 are contained within integrated circuit 142. Integrated circuit 142 is a multifunction FM IF integrated circuit manufactured by Motorola, Incorporated, Phoenix, Ariz. designated part number MC3357. Input 141 is connected to an internal balanced mixer which mixes the incoming signal with a 10.245 MHz second local oscillator signal. The second local oscillator is comprised of internal circuitry combined with an external crystal filter consisting of 10.245 MHz crystal 146 and capacitors 148 and 150. The internal mixer provides a 455 KHz second IF frequency signal, as well as several higher-frequency components, on output line 152 of integrated circuit 142 and therefrom to 455 KHz four-pole ceramic filter 154. Filter 154 passes the signal at the second IF frequency of 455 KHz and removes the undesired frequencies. The filtered IF signal is then fed through input line 156 to an internal limiting IF amplifier and therefrom to a quadrature detector comprised of an internal multiplier and externally connected quadrature coil 158 and associated components. The demodulated signal, which includes audio and sub-audio frequencies, appears on output line 160 of integrated circuit 142 and is coupled therefrom to a de-emphasis circuit consisting of resistor 162 and capacitor 164. The de-emphasis circuit output signal which appears on capacitor 164 is fed through tone encoder/decoder 24, shown in block form, to volume control potentiometer 166 and therefrom to audio amplifier 26. The operation of tone encoder/decoder 24 will be described more fully hereinafter. When squelch transistor 96 is ON, as will be described, such that audio amplifier 168 is connected to the supply voltage, audio amplifier 168 amplifies the output signal from tone encoder/decoder 24 and supplies the amplified signal to 8-ohm speaker 28 through capacitor 170.

The audio output present on line 160 of integrated circuit 142 is also fed to the squelch circuit which includes bandpass filter 172, detector 174, internal Schmitt trigger circuitry connected between input line 176 and output line 200 of integrated circuit 142, and squelch transistors 202 and 96. Bandpass filter 172 includes an inverting operational amplifier internal to integrated circuit 142 and connected between input line 178 and output line 180, as well as resistor 182 and capacitors 184 and 186. The external components are selected for a center frequency of 8 KHz, which is above the voice frequency range. The output of bandpass filter 172 is applied to detector 174 consisting of diodes 188 and 190, resistors 192 and 194, potentiometer 196 and capacitor 198. In the presence of noise, the demodulated signal on output line 160 contains frequency components around 8 KHz which are amplified by bandpass filter 172. The amplified noise is coupled to detector 174 causing the output thereof, connected to input line 176 of integrated circuit 142, to exceed 0.6 volts. This causes the internal Schmitt trigger to switch, which in turn causes output line 200 of integrated circuit 142 to appear as an open circuit. In this situation, the base of transistor 202 is pulled to ground through resistor 204. The base of transistor 202 is also connected to the TONE SQUELCH line, and to TALK switch 58 (FIG. 2) through diode 205. As will be described with reference to FIG. 9, the TONE SQUELCH line is open if a tone is detected or if tone encoder/decoder 24 is disabled, and is otherwise LOW. The POWER SAVE line cannot supply current to line 200, and diode 205 blocks input current, so output line 200 of integrated circuit 142 is the only source of base current for transistor 202. Thus, transistor 202 is OFF if any one of the following conditions exists: (1) line 200 is open; (2) the TONE SQUELCH line is LOW; or (3) the line from TALK switch 58 is held LOW by depressing the switch. When transistor 202 is OFF, no base current flows through transistor 96, and therefore transistor 96 is also OFF such that audio amplifier 168 is disconnected from the supply voltage. In the case of a received carrier, the output of the FM detector in integrated circuit 142 does not contain frequency components in the bandwidth of bandpass filter 172, so no signal is applied to detector 174. As a result, the input voltage at input line 176 of integrated circuit 142 is less than 0.6 volts, and output line 200 switches to its logical one (HIGH) state. Integrated circuit 142 then supplies current through resistor 206 to the base of transistor 202 causing that transistor to turn ON. Transistor 202 turns ON transistor 96 which then supplies power to audio amplifier 26. Potentiometer 196 provides squelch control by determining the threshold of squelch action.

Figure 5A:
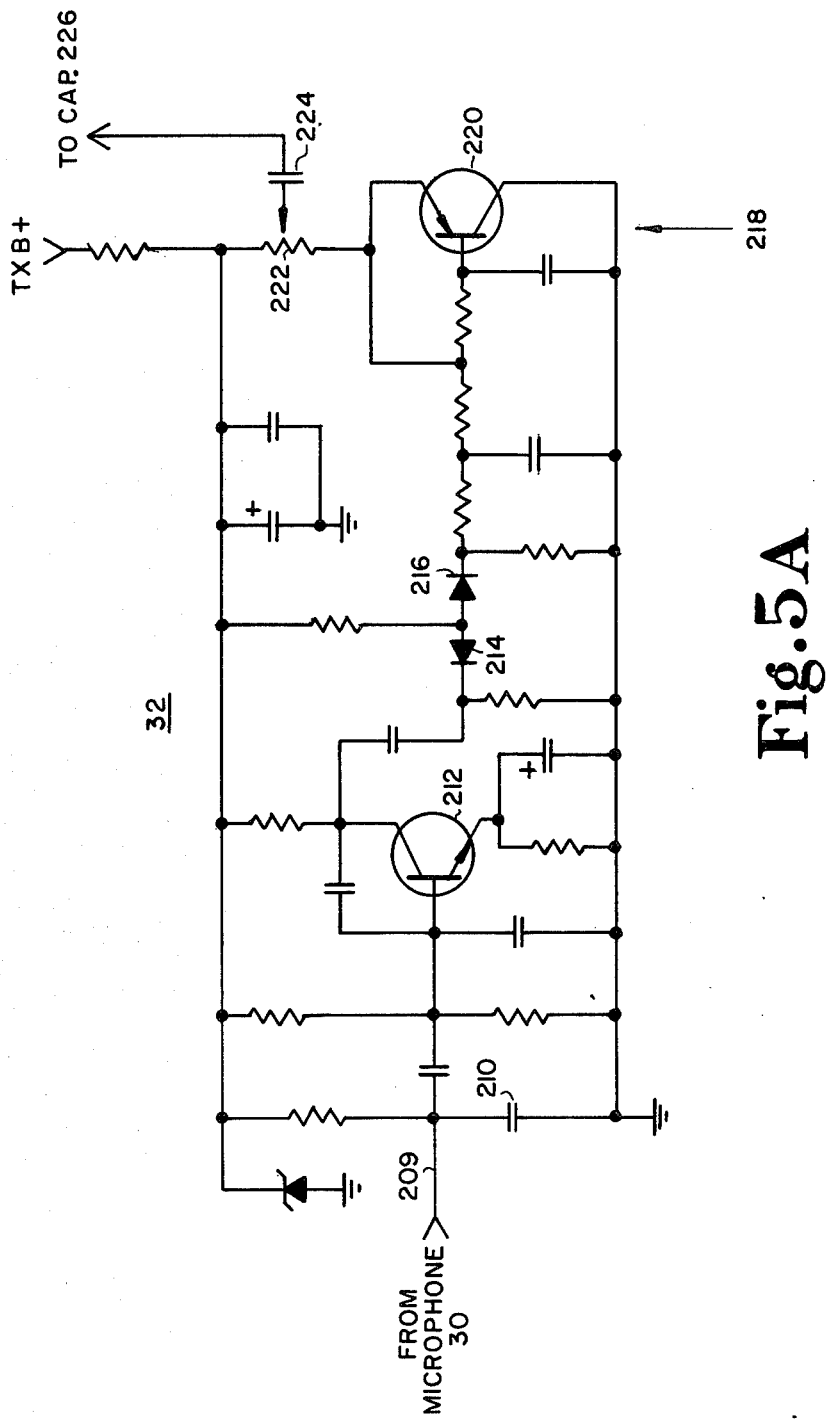
FIG. 5A is a schematic diagram of the speech amplifier shown in FIG. 1.

Microphone 30 converts speech input into an electrical signal appearing on line 209. Speech amplifier 32 and transmitter power amplifier 34 (FIG. 1), the primary transmitter amplifiers, are shown in schematic form, respectively, in FIGS. 5A and 5B. Referring now to FIG. 5A, line 209 is connected to the input of a transistor amplifier consisting of transistor 212 and associated components. The amplified audio signal appearing at the collector of transistor 212 is fed to the diode clipping circuit consisting of diodes 214 and 216 which limits the amplitude of the signal fed to low pass filter 218. Filter 218, consisting of transistor 220 and associated components, provides a −18 db/octave gain characteristic for frequencies above a corner frequency of 3 KHz. The signal on the wiper of potentiometer 222 is applied through coupling capacitor 224 to capacitor 226 of FIG. 6.

Figure 6:
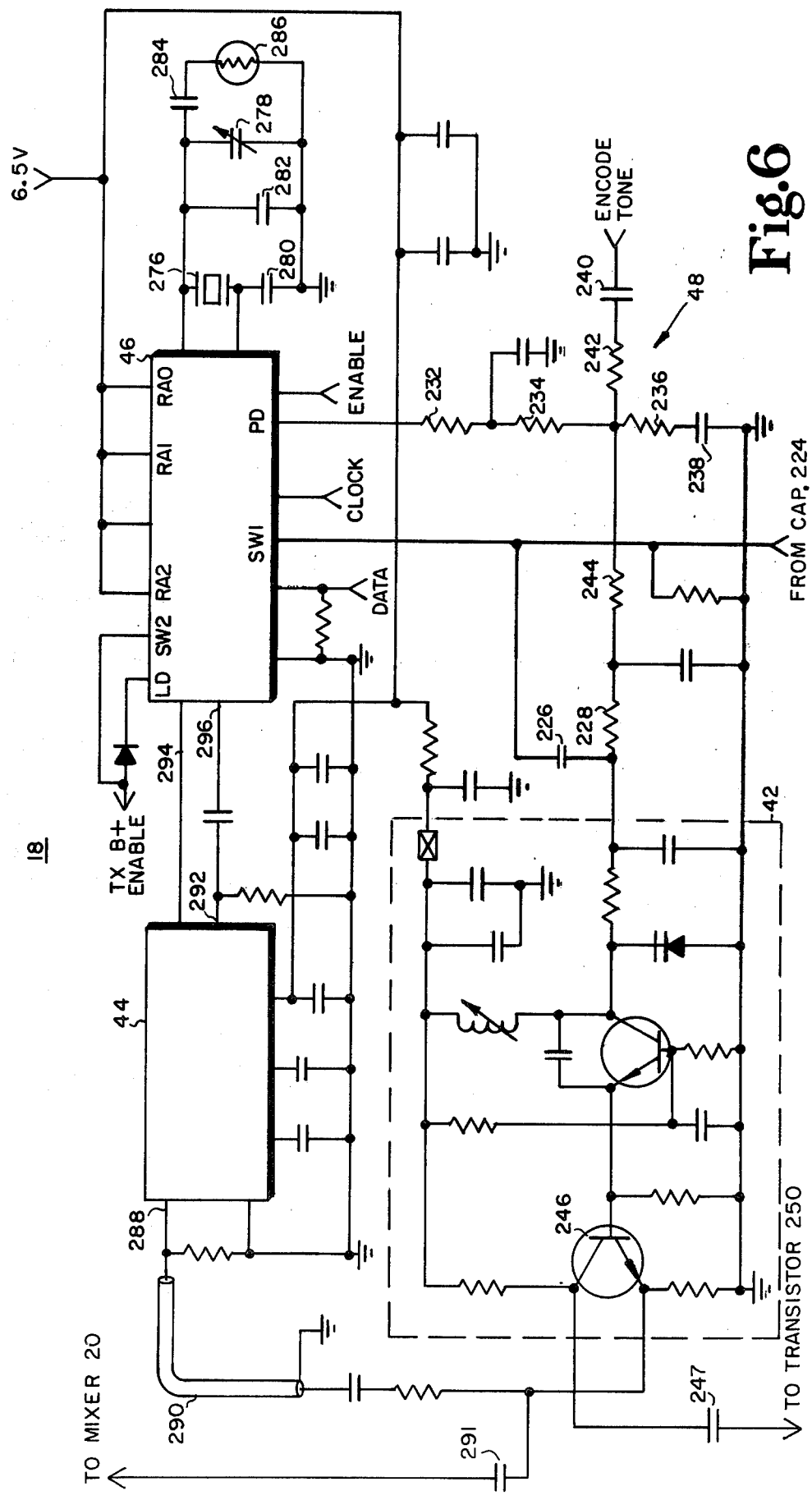
FIG. 6 is a schematic diagram of the phase-locked loop frequency synthesizer shown in FIG. 1.

Referring more particularly to FIG. 6, capacitors 224 and 226 are both connected to the SW1 output of divider/comparator 46. The SW1 output, which is controlled, as will be described, by data supplied from PROM 54 (FIG. 1), assumes a high-impedance state in transmit mode whereby the signal from capacitor 224 is fed through capacitor 226 to VCO 42. In receive mode, the SW1 output is LOW. thus residual speech signals propagating through speech amplifier 32 of FIG. 5A despite the lack of power to that amplifier are prevented from reaching VCO 42.

Resistors 232, 234 and 236 and capacitor 238 are the principal components which determine the fundamental pole of low pass filter 48 and thus the bandwidth of the loop. They are selected for a corner frequency lower than the lowest tone signal frequency of 67 Hz in order to make the loop substantially insensitive to modulation signal inputs. As a result, VCO 42, which operates under closed loop control at a nominal frequency equal to the desired carrier frequency, deviates in frequency in response to the injected audio signal. Potentiometer 222, connected to the emitter of transistor 220 as shown in FIG. 5A, controls the modulation level of the transmitter by controlling the maximum deviation from the nominal frequency of VCO 42. The tone signal for encoding the transmitted audio information, the generation of which will be described more fully hereinafter, is coupled to the ENCODE TONE input of frequency synthesizer 18, from which it is fed into VCO 42 through capacitor 240 and resistors 242, 244 and 228. Component values are selected, in a manner known to those skilled in the art, such that filter 48 provides additional attenuation of the incoming tone signal in order to limit the voltage swing at the output of VCO 42 in response to the tone signal. Thus direct frequency modulation with audio and sub-audio tone modulation signal inputs is accomplished. The resulting FM signal on the collector of buffer transistor 246 of VCO 42 is then fed to transistor 250 of transmitter power amplifier 34 shown in FIG. 5B.

Figure 5B:
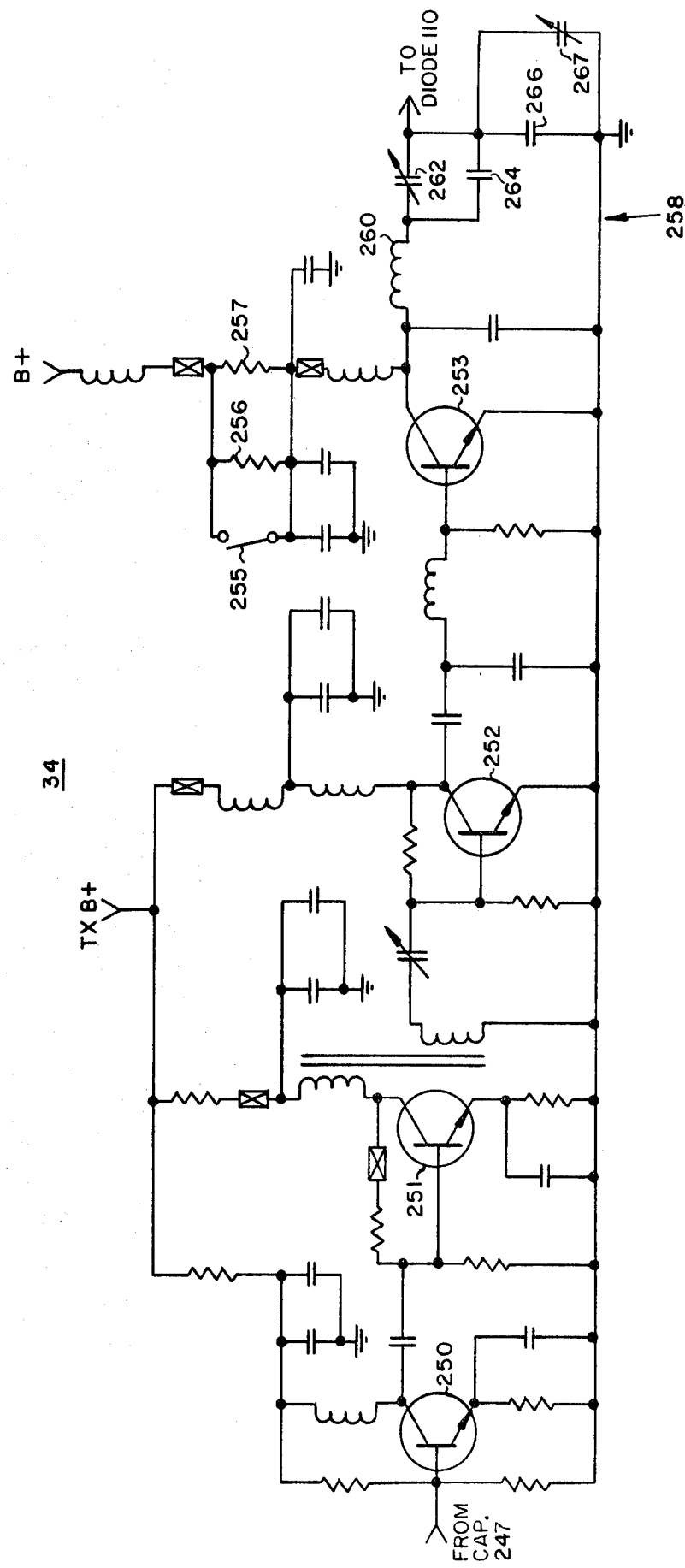
FIG. 5B is a schematic diagram of the transmitter power amplifier shown in FIG. 1.

With reference to FIG. 5B, transmitter power amplifier 34, consisting of transistors 250, 251, 252, 253, and associated components, amplifies the modulated signal to a power level of appoximately 4 watts. Low-power operation can be selected with switch 255. With switch 255 open, resistors 256 and 257 limit the supply current to transistor 253. Resistors 256 and 257 are selected for a low-power output of less than 1 watt. The amplified output signal from transmitter power amplifier 34 is coupled to impedance-matching network 258, consisting of inductor 260 and capacitors 262, 264, 266 and 267, and therefrom to antenna switch 14 shown in FIG. 2. Impedance-matching network 258 matches the output impedance of power amplifier 34 to the 50-ohm impedance of ellipic filter 84 and antenna 12 shown. respectively, in FIG. 2 and FIG. 1

Referring again to FIG. 2, when TALK switch 58 is depressed and the TX B+ ENABLE line is open, the cathode of PIN diode 116 is shorted to ground at the end of a lumped equivalent quarter-wavelength line section consisting of inductor 118 and capacitors 120 and 124 in antenna switch 14. PIN diodes 110 and 116 are forward biased due to bias current received from TX B+ control transistor 94, as has been described. Therefore, diode 110 passes output power from impedance-matching network 258 (FIG. 5B) to elliptic filter 84 and therefrom through test jack 82 to antenna jack 126. When shorted, the quarter-wavelength line section isolates the receiver section connected to the transmitter RF power. To further isolate the receiver from the transmitter, diode 268 is connected, as shown in FIG. 3, between capacitor 270 (FIG. 3) and to TALK switch 58. When TALK switch 58 is depressed, diode 268 is connected in parallel with capacitor 270, causing substantially complete attenuation of any residual signal received at the input of filter circuit 128.

Referring again to FIG. 6, the operation of the frequency synthesizer will now be described. The major components of the frequency synthesizer are VCO 42, prescaler 44 (Motorola CMOS MC12016P), divider/-comparator 46 (Motorola CMOS MC145156P) and low pass filter 48 arranged to form a phase-locked loop. Divider/comparator 46 includes a reference oscillator whose frequency is principally determined by externally connected 10.240 MHz crystal 276, which is an AT cut crystal operating in fundamental mode. The reference oscillator is trimmed to frequency by variable capacitor 278. Capacitors 278, 280, 282 and 284 and thermistor 286 stabilize the reference oscillator frequency against changes in temperature. At temperatures below 5 degrees centigrade the resistance of thermistor 286 rapidly increases and removes the influence of capacitor 284 from the crystal oscillator. This compensates for the sudden decrease in crystal operating frequency for AT cut crystals at those temperatures. Divider/comparator 46 has control inputs RA0, RA1 and RA2 which determine the divider value of an internal reference frequency divider. In the preferred embodiment each of these inputs is set HIGH by connection to the supply voltage. This results in a total divider value of 2048 whereby the reference frequency divider produces a 5 KHz reference frequency which is applied to the reference input of an internal digital phase detector.

The reference frequency may alternatively be set to 12.5 KHz for applications requiring 12.5 KHz channel steps. For such applications a 12.8 MHz crystal is selected for crystal 276, and control input RA0 of divider/comparator 46 is held LOW to obtain a total divider value of 1024.

The digital phase detector has another input for a variable frequency signal having frequency equal to the VCO 42 output signal frequency divided by a number determined by data supplied to divider/comparator 46 and prescaler 44.

Figure 7:
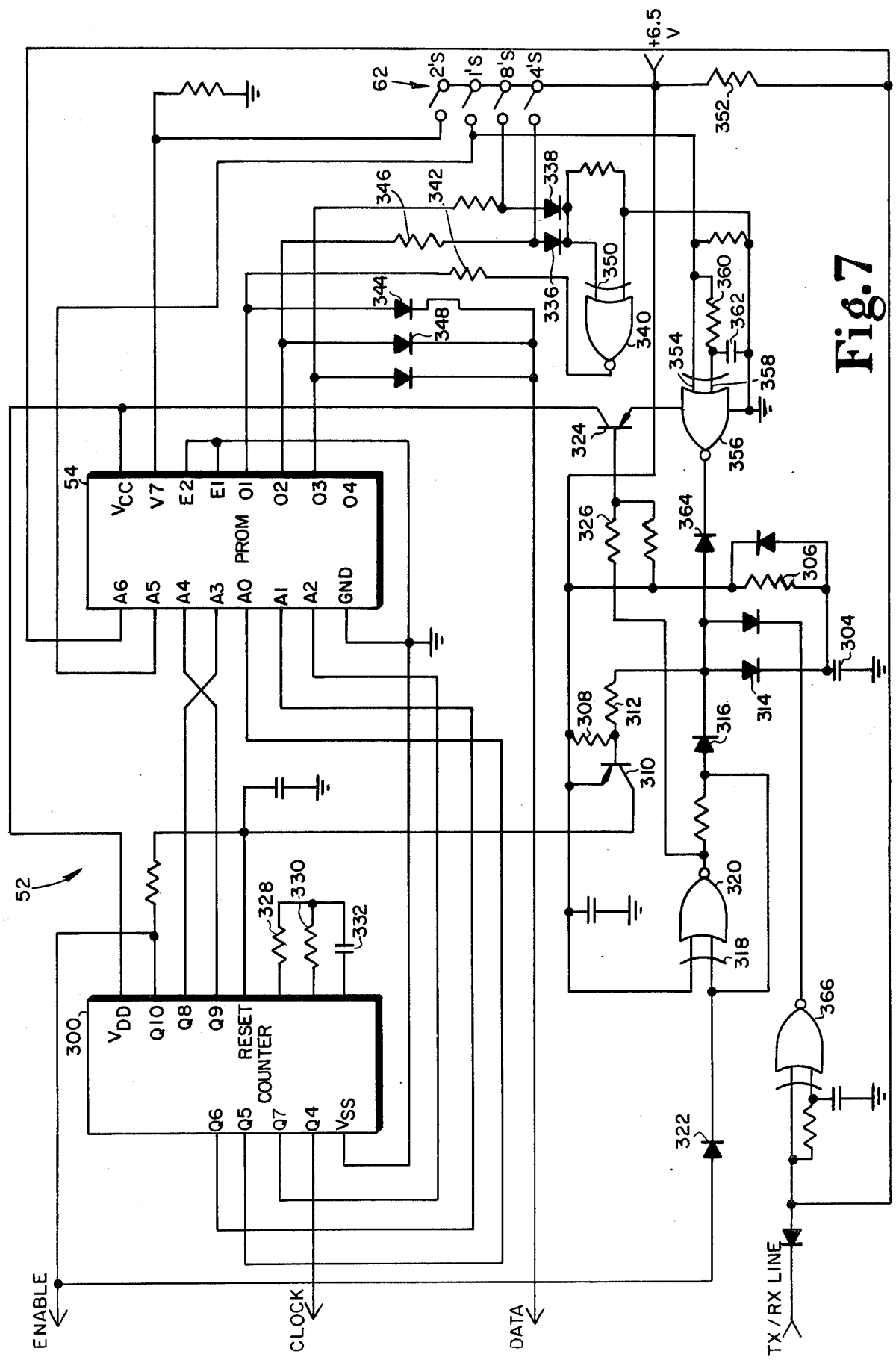
FIG. 7 is a schematic diagram of a portion of FIG. 1 and includes the controller, PROM and channel select switch.
Figure 8:
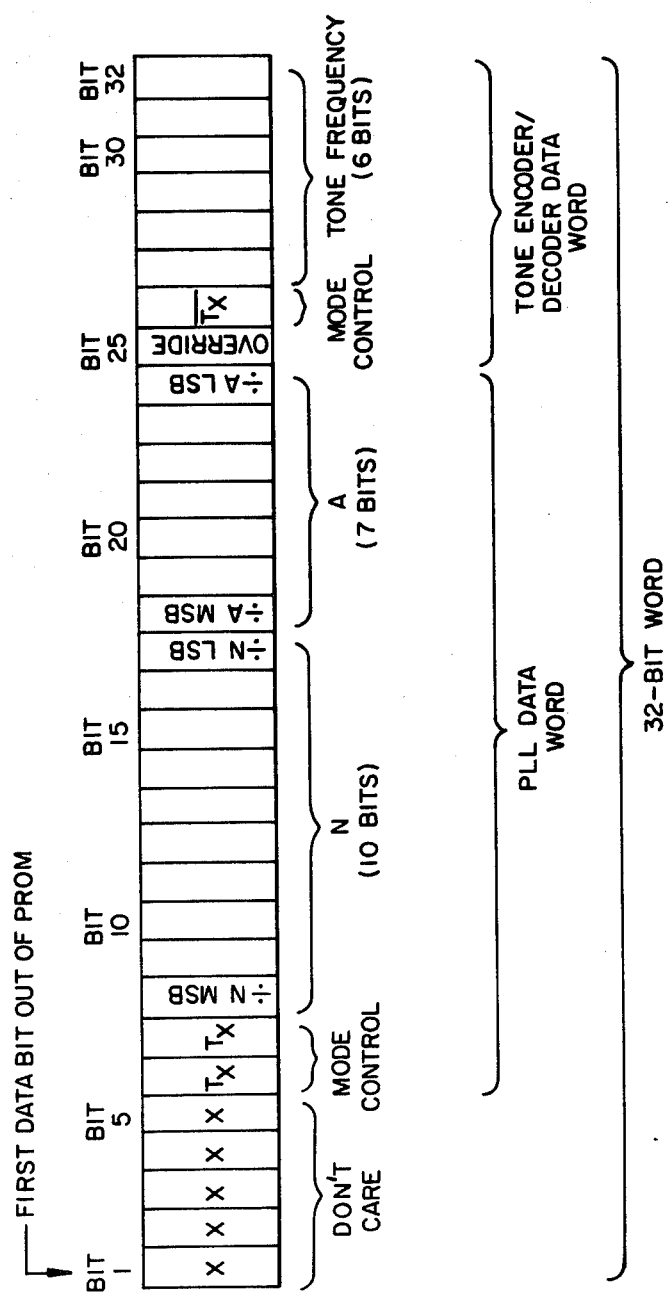
FIG. 8 illustrates the format of a data word which is stored in the PROM for a given channel and position of the talk switch.

Divider/comparator 46 also includes a 10-bit programmable divide-by-N (N) counter, a 7-bit programmable divide-by-A (A) counter, shift registers and latches for accepting serial input data from PROM 54 (FIG. 1), as well as counter and modulus control logic. The data stream, as will be described later, consists of 32 bits including a PLL data word and a tone encoder/decoder data word. The data format is illustrated in FIG. 8. The data stream is shifted into internal shift registers of divider/comparator 46 through the DATA input under control of the CLOCK signal received on the CLOCK line from controller 52 of FIG. 1. As will be understood from FIG. 7 and the accompanying description, when the last bit of the PLL data word is received, the CLOCK stops and the ENABLE line goes HIGH. The data contained in the shift registers is then transferred into internal latches, and the N and A counters are respectively preset to the numbers N and A. This causes the PLL to search for and lock on the frequency corresponding to the new data received.

The output signal on the emitter of buffer transistor 246 of VCO 42 is fed to signal input 288 of prescaler 44 through shielded cable section 290. The signal on the emitter of transistor 246 is the local oscillator signal for the receiver and is coupled to mixer 20 (FIG. 3) through capacitor 291. The interaction of prescaler 44 and divider/comparator 46 may be described as follows. The logic level of output 292 of prescaler 44 changes once every 40 or 41 cycles of the input signal depending on the logic level of modulus control line 294 which is determined, as will be described, by the A and N counters in divider/comparator 46. Prescaler 44 divides by 40 when control line 294 is HIGH and divides by 41 when control line 294 is LOW. At the beginning of each count cycle, modulus control line 294 is LOW, so prescaler 44 outputs a single pulse after 41 cycles of the input signal from VCO 42. The output of prescaler 44 is coupled through input 296 of divider/comparator 46 to both the A and N counters, which simultaneously count input pulses. The A and N counters decrement by one for each input pulse received from prescaler 44. After the A counter decrements to zero, modulus control line 294 goes HIGH and remains HIGH until the N counter has decremented to zero. The N counter reaches zero after an additional N - A input pulses from prescaler 44, at which time it supplies an output pulse to the variable frequency input of the phase detector. Modulus control line 294 is then reset, the counters are again preset to their respective program values, and the next count cycle begins. Thus, the phase detector receives one pulse for every 41A+40 (N - A) cycles of the VCO output signal.

The phase detector compares both the frequency and phase of the reference and variable inputs and produces an output at the PD output of divider/comparator 46 which is used as a loop error signal. The PD output is a three-state output which is LOW when the variable frequency is greater than the reference frequency of 5 KHz, is HIGH when the variable frequency is less than 5 KHz and is at a high-impedance state when the two frequencies are equal and the signals in phase. Low pass filter 48 averages the positive and negative pulses from the PD output and applies the average voltage to VCO 42 to increase or decrease the VCO output frequency in order to cancel the loop error voltage generated by the phase detector. At phase lock, the variable frequency input signal to the phase detector equals 5 KHz. Therefore the VCO output frequency can be determined from the equation $$f = (40N + A)(5 \text{ KHz})$$

The SW1 and SW2 outputs of divider/comparator 46 provide latched open drain outputs corresponding to data bits 6 and 7 of the data received from PROM 54 (FIG. 1). Both bits are HIGH for transmit mode and LOW for receive mode. The SW1 and SW2 outputs assume a high-impedance state when the bits are HIGH and a LOW state when the bits are LOW. The SW1 output is used to pull capacitor 226 substantially to ground in receive mode so that residual speech signals propagating through speech amplifier 32 despite the lack of power thereto cannot reach VCO 42. The SW2 output operates in conjunction with the LD output of divider/comparator 46 to produce the control signal on the TX B+ENABLE line which is applied to TX B+control circuit 70 (FIG. 2). The TX B+ENABLE line is held LOW by a LOW level output from either the LD or SW2 output. Thus the transceiver must be in transmit mode and the LD output must be HIGH in order for the transmitter sections of the transceiver to receive power. The LD output is HIGH when the PLL is locked, and it pulses LOW if the loop fails to properly lock on a programmed frequency. This turns the transmitter sections off thereby preventing transmission on a spurious frequency.

The operation of controller 52 and PROM 54 shown in FIG. 1 will be described with reference to FIG. 7. Counter 300 (National Semiconductor CD4060) generates address information for PROM 54 (National Semiconductor DM74S387) when power is applied to it and its RESET input is LOW. When ON/OFF switch 88 (FIG. 2) is turned on, voltage regulator 90 (FIG. 2) applies power to the +6.5 V input line to controller 52 and PROM 54. Capacitor 304 performs a power-on reset function, insuring that exclusive-NOR gate 320 latches in the LOW state on power turn-on as well as causing an initial reset signal to be applied to the RESET input of counter 300 through transistor 310. Initially completely discharged, capacitor 304 receives charging current from the 6.5 volts supply through resistor 306 as well as through the path consisting of resistor 308 in parallel with the emitter-base junction of transistor 310 and in series with resistor 312 and diode 314. The initial base current flowing out of transistor 310 is high enough for transistor 310 to turn ON causing the base thereof to reach a potential of approximately 5.8 volts DC. When transistor 310 turns on, the RESET input of counter 300 goes HIGH. Should exclusive-NOR gate 320 come up HIGH on power turn-on, the initial low voltage state of capacitor 304 also initially renders diode 316 conductive. Gate 320 then supplies current to capacitor 304. With a voltage drop of approximately 0.7 volts DC across each of diodes 314 and 316, the anode of diode 316 and, consequently, input 318 of exclusive-NOR gate 320, are initially at 1.4 volts. Output Q10 of counter 300 is initially LOW, so diode 322 is nonconductive. Since 1.4 volts on input 318 is a LOW input voltage to exclusive-NOR gate 320, and since the other input is HIGH the output of gate 320 goes LOW. This latches exclusive-NOR gate 320 in the LOW state and causes diode 316 to become reverse biased.

When exclusive-NOR gate 320 latches LOW, base current flows out of transistor 324 through resistor 326 into the output of gate 320, and consequently transistor 324 turns ON and connects 6.5 volts DC to PROM 54 and counter 300. As capacitor 304 charges, the base current from transistor 310 decreases until transistor 310 is cut off. The RESET input of counter 300 goes LOW thereby enabling an internal oscillator which then begins to oscillate at a frequency determined by resistors 328 and 330 and capacitor 332. Outputs Q5, Q6, Q7, Q8 and Q9 of counter 300 representing outputs of internal stages 5 through 9, form the five least significant bits A0 through A4 of the address word for PROM 54. As address lines A0 through A4 are sequenced by outputs Q5 through Q9 of counter 300, 32 4-bit data words appear at open-collector outputs 01-04 of PROM 54. By enabling only one output for any single data read cycle, serial output of a single 32-bit word is accomplished. FIG. 8 illustrates the bit format for the 32-bit word.

CHANNEL SELECT switch 62 determines which output of PROM 54 is selected. CHANNEL SELECT switch 62 is a binary-coded decimal (BCD) switch. For channels 0, 1, 2 or 3 neither the 8's nor 4's output of CHANNEL SELECT switch 62 is connected to 6.5 volts. Therefore, since all outputs of PROM 54 are open-collector transistors. outputs 02 and 03 remain in a LOW state throughout the read cycle for those channels. Neither diode 336 nor diode 338 is forward biased. so both inputs of exclusive-NOR gate 340 are LOW whereby the output is HIGH. Thus output 01 of PROM 54 is enabled, with gate 340 supplying a HIGH output through resistor 342 and diode 344 to the DAT terminal and therethrough to tone encoder/decoder 24 (FIG. 1) when output 01 is HIGH. Resistor 342 limits current flow from gate 340 into output 01 of PROM 54 when output 01 is LOW. For channels 4 5, 6 and 7, the 4's output of CHANNEL SELECT switch 62 is connected to B+IN so as to enable output 02 of PROM 54. When output 02 is HIGH, supply current flows through resistor 346 and diode 348 to the DATA terminal. Only output 02 of PROM 54 is enabled. Diode 336 is forward biased, thus input 350 of gate 340 is HIGH, which causes the output of gate 340 to go LOW thereby disabling output 01 of PROM 54. The 8's output of CHANNEL SELECT switch 62 is not connected to B+IN, and diode 338 blocks current flow from diode 336, thus output 03 of PROM 54 is also disabled. Similarly, for channels 8 and 9, the 8's output of CHANNEL SELECT switch 62 is HIGH but the 4's output is LOW. Only output 3 of PROM 54 is enabled in this case. The 1's and 2's outputs of CHANNEL SELECT switch 62 control address lines A5 and A7, respectively, of PROM 54 and select one of four possible banks in PROM 54 for data acquisition. Transmit and receive mode data words are contained in separate banks of the memory. TALK switch 58 (FIG. 1) selects the appropriate bank by controlling the logic state of address line A6 of PROM 54. TALK switch 58 has one contact connected to the TX/RX line and the other contact connected to ground. When TALK switch 58 is not depressed, the TX/RX line is left open, and address line A6 is pulled up to the supply voltage level through resistor 352. When TALK switch 58 is depressed, the TX/RX line is connected to ground causing address line A6 to go LOW.

Output Q10 of counter 300 goes HIGH after the 32nd data bit has been read from PROM 54, thus generating a signal on the ENABLE line which is coupled to divider/comparator 46 of the PLL shown in FIG. 6. As stated previously, this causes the PLL to search for and lock on a new frequency. When the ENABLE line goes HIGH, diode 322 becomes forward biased causing input 318 of exclusive-NOR gate 320 to go HIGH, which in turn causes the output of gate 320 to latch HIGH. Output Q10 of counter 300 also causes the RESET input of counter 300 to go HIGH, thus resetting counter 300 and stopping its internal oscillator. Transistor 324 turns off when gate 320 goes high. It can thus be appreciated that PROM 54 and counter 300 draw no current except when data is being read from PROM 54 to establish a new frequency and mode of operation.

Either a change of channels with CHANNEL SELECT switch 62 or a change of position of TALK switch 58 causes a memory read operation to begin. Any time that a channel is changed, the 1's output of CHANNEL SELECT switch 62 changes state. Input 354 of exclusive-NOR gate 356 responds immediately to this change in state but input 358 lags behind because of the delay circuit consisting of resistor 360 and capacitor 362. Gate 356 goes LOW momentarily as a result, whether the 1's output of switch 62 is changed from a LOW state to a HIGH state or vice versa. It should be recognized that, due to mechanical differences among the four switch poles in CHANNEL SELECT switch 62, the various poles may switch at different times when a channel is changed, especially if the switch is operated slowly. Such switch action could cause erroneous readout of frequency data. Therefore, the time constant determined by resistor 360 and capacitor 362 is preferably sufficiently long so as to maintain the output of gate 356 LOW until all contacts of switch 62 have settled into their new positions. The LOW output of gate 356 forward biases diodes 364 and 316 thereby causing input 318 of gate 320 to go LOW. Gate 320 then latches in the LOW state as described previously, and a new read cycle begins. Similarly, when TALK switch 58 is pushed or released, exclusive-NOR gate 366 goes LOW. and a new read cycle begins.

Reference is now made to FIG. 9, which shows tone encoder/decoder 24 of FIG. 1 in schematic form. The circuit operation will first be generally described. Tone encoder/decoder 24 is a Continuous Tone-Coded Squelch System (CTCSS) capable of generating and decoding 37 discrete tones according to the EIA RS-220-A Standard. Integrated circuit 368 is a CTCSS encoder/decoder manufactured by MX-COM, Inc., Winston-Salem, N.C. and identified as part number MX325A. Integrated circuit 368 contains a frequency synthesizer and a comprehensive set of analog and digital notch and bandpass filters which can be programmed either for generation or detection of a single tone frequency. Shift register 370 receives an entire 32-bit data word (FIG. 8) corresponding to frequency and mode information for a selected position of CHANNEL SELECT switch 62 (FIG. 7) and TALK switch 58 shown in FIG. 1. The last eight bits remain in shift register 370 for controlling the operation of integrated circuit 368. In transmit mode, integrated circuit 368 generates a tone having a frequency determined by the data supplied to its programming inputs and couples the tone signal to VCO 42. In receive mode, integrated circuit 368 receives the demodulated signal, including voice and tone signals, and feeds it to two filter networks. One filter network is programmed to sense the presence of a tone of a specific frequency determined by the data on the programming inputs of integrated circuit 368. The other filter network is a programmable notch filter which is set to the frequency of the desired tone signal so as to greatly attenuate the tone component of the audio signal. The output of the programmable notch filter is fed to an electronic switch which, if the desired tone frequency is present in the received signal, is closed so as to pass the audio signal out of tone encoder/decoder 24 to audio amplifier 26 (FIG. 1).

With continuing reference to FIG. 9, the operation of tone encoder/decoder 24 will now be described in more detail. Tone encoder/decoder 24 receives supply voltages, at the B+ and +6.5 V inputs, from ON/OFF switch 88 and voltage regulator 90 shown in FIG. 2. Transistor 372 is an additional voltage regulator used to provide a supply voltage of +5.8 volts DC to tone encoder/decoder 24. The 6.5 volts DC input provides a reference voltage on the base of transistor 372, the unregulated input voltage (approximately 8.4 volts DC) being supplied on the B+ input.

In either transmit or receive mode, a particular CTCSS frequency is selected by setting the appropriate programming inputs of integrated circuit 368 either HIGH or LOW. The tone frequency data word for these inputs is read out of PROM 54 of FIG. 7 as part of the 32-bit stream previously mentioned. The data stream is fed into the DATA IN input of shift register 370 and shifted through shift register 370 under control of the CLOCK signal generated by counter 300 shown in FIG. 7. With output Q4A and the DATA B input of shift register 370 connected together as shown, and with the CLOCK A and CLOCK B inputs also tied together, shift register 370 forms an 8-stage serial-input/parallel-output register. The logic level present at the DATA IN input is transferred into the first register stage, which has its output connected to the Q1A output, and shifted over one stage at each positive-going CLOCK transition. Data is shifted through shift register 370 in the sequence Q1A, Q2A, Q3A, Q4A, Q1B, Q2B, Q3B and Q4B. Data shifted out of the last stage, Q4B, is fed to the DATA OUT output of tone encoder/decoder 24 and from there to the DATA input of divider/comparator 46 shown in FIG. 6. As mentioned, the data transfer stops after 32 bits have been read out of PROM 54 (FIG. 7).

The bits remaining in shift register 370 comprise the 8-bit tone encoder/decoder data word shown in FIG. 8. The Q4B output, bit 25 of the 32-bit data word, controls an OVERRIDE circuit in integrated circuit 368. As will be explained more fully hereinafter, the tone squelch function of integrated circuit 368 may be overridden by supplying a HIGH input to the OVERRIDE input of integrated circuit 368. For channels carrying a sub-audio tone, Q4B is HIGH after the data transfer is complete so as to supply base current to transistor 374 through resistor 376 and thereby turn transistor 374 ON. This causes the OVERRIDE input of integrated circuit 368 to be normally LOW. For channels without a sub-audio tone, e.g., weather channels, integrated circuit 368 must be overridden in order to hear the transmission. This can be accomplished by programming bit 25 LOW. Manual override is also provided, as will be explained. Output Q3B of shift register 370, coupled to the MODE input of integrated circuit 368, is HIGH for receive mode and LOW for transmit mode. The remaining six bits determine the state of the programming inputs of integrated circuit 368.

In transmit mode, data applied to the programming inputs is coupled to and determines the operating frequency of an internal frequency synthesizer. Crystal 378 and associated components determine the reference frequency for the internal synthesizer. The generated tone signal appears at the TX output of integrated circuit 368 and is fed to a low pass filter comprised of resistor 380, potentiometer 382 and capacitor 384. The filtered output signal is coupled through resistor 386 to the TONE OUT line which is coupled to the ENCODE TONE input of VCO 42 shown in FIG. 6.

The TONE IN input of encoder/decoder 24 is connected to the DECODE TONE output of integrated circuit 142 shown in FIG. 4. In receive mode, then, the demodulated output signal of integrated circuit 142 appears at the TONE IN input of encoder/decoder 24. This signal which contains both audio and sub-audio components, is coupled to transistor amplifier 388 and therefrom to the AUDIO input of integrated circuit 368. This input signal is fed to a low pass filter having a cutoff frequency of 3.4 KHz, which in turn is coupled to a programmable notch filter as well as to a programmable filter network having a low pass filter and a bandpass filter designed to pass the tone frequency signal component but substantially reject the audio frequency component.

The output of the filter network is coupled to a detector which sets a latch HIGH if an individual cycle of the output of the filter network falls within a predetermined frequency range. The latch output appears at the INBAND output of integrated circuit 368. The INBAND output responds to frequency changes in an individual cycle and therefore can change rapidly due to the effects of residual voice frequency signals and noise. For this reason resistor 390 and capacitor 392 are provided as a delay circuit to establish a minimum validity period. When a tone of the programmed frequency is detected, the INBAND output goes HIGH and causes capacitor 392 to charge through resistor 390, assuming that transistor 374 is held ON such that diode 394 is reverse biased. No charging current flows through the series combination of resistor 396 and diode 398, connected in parallel with resistor 390, because diode 398 is reverse biased when the INBAND output is HIGH and capacitor 392 is charging. Resistor 396 and diode 398 are provided to give capacitor 392 a discharge time which is faster than its charge time in order to achieve rapid squelch action in response to absence of the desired tone. This minimizes the so-called "squelch tail" which occurs at the end of a transmission.

The ungrounded side of capacitor 392 is further coupled to the inverting input of an internal comparator. To obtain a more positive audio switching action, this comparator is connected in a conventional manner to external resistors 400, 402 and 404 to form an inverting level detector With hysteresis. As a result of positive feedback through resistor 404, the comparator circuit has an upper and lower threshold voltage. With capacitor 392 completely discharged, the threshold level assumes the upper threshold voltage. Capacitor 392 charges relatively slowly up to the upper threshold voltage, at which point the comparator output switches from a HIGH to a LOW level and causes the threshold level to switch to the lower threshold voltage. The threshold voltage immediately returns to the upper threshold level when the voltage on capacitor 392 subsequently falls below the lower threshold voltage. Resistors 400, 402 and 404 are most preferably selected to yield upper and lower threshold voltages of approximately 4 volts DC and 2 volts DC, respectively. The output of the internal comparator circuit is connected to one input of a NAND gate the other input of which is connected to an OVERRIDE circuit, to be discussed more fully hereinafter. When the OVERRIDE circuit output is HIGH, the NAND gate is enabled whereby a LOW output from the comparator circuit causes the NAND gate to go HIGH which then enables the analog switch.

The input of the analog switch is connected to the output of the programmable notch filter previously mentioned so that, when the switch is enabled, it passes the audio signal to the SWITCHED AUDIO output of integrated circuit 368. The SWITCHED AUDIO output is loaded by resistor 406, connected to the BIAS output of integrated circuit 368, in order to reduce noise pickup when the internal analog switch is in its high-impedance state. Capacitor 408 connected between the BIAS output and ground decouples noise from the internally generated bias voltage.

The signal appearing at the SWITCHED AUDIO output is fed to resistor 410 which, with capacitor 412, acts as an audio filter. The output of this filter is then coupled to the SWITCHED AUDIO OUT line of tone encoder/decoder 24 and therefrom to volume control potentiometer 166 shown in FIG. 4. The internal programmable notch filter contained in integrated circuit 368 attenuates the level of the tone signal in the demodulated received signal. Thus, when a tone signal having the desired CTCSS tone frequency is detected for a sufficient length of time, voice signals are passed through integrated circuit 368 and fed to audio amplifier 26 (FIG. 4) through potentiometer 166.

The output of the internal comparator also connects to the base of transistor 414 through resistor 416. When the comparator output is HIGH, as when no tone is received, transistor 414 turns ON and the TONE SQUELCH line, which is connected to the base of transistor 202 of FIG. 4, goes LOW. This causes transistor 202 to turn OFF and thereby turn OFF transistor 96, which then removes supply voltage from audio amplifier 26, as described with reference to FIG. 4.

When it is desired to monitor a channel before transmitting, the tone squelch system may be manually overridden by closing a tone squelch switch (not shown) connected between the SQ MON line and ground. This pulls the base of transistor 374 to ground and thereby turns that transistor OFF. With transistor 374 OFF, its collector is pulled HIGH through resistor 418. The OVERRIDE input of integrated circuit 368 is connected by an internal OVERRIDE circuit inverter to the NAND gate previously mentioned. When the OVERRIDE input is at a HIGH level, the NAND gate output goes HIGH regardless of the output state of the internal comparator. This turns on the analog switch and thereby couples the received audio signal to audio amplifier 26.

Integrated circuit 368 has a POWER SAVE input which sets the decoder into a standby condition when held LOW. This input is connected by resistor 420 and the POWER SAVE line to output line 200 of integrated circuit 142 shown in FIG. 4. When line 200 is HIGH, as in the case of a received carrier, the POWER SAVE input of integrated circuit 368 assumes a voltage level determined by the level translator formed by resistors 420 and 422. Resistors 420 and 422 are selected such that the POWER SAVE input voltage is a HIGH input voltage to internal logic in integrated circuit 368 when line 200 is HIGH, whereby the decoder in integrated circuit 368 is enabled. In the presence of noise, output line 200 of integrated circuit 142 appears as an open circuit, and in that case the POWER SAVE input of integrated circuit 368 is pulled LOW through resistor 422. This disables the decoder, although the POWER SAVE input can be overridden by a transmit or override command.

Figure 10:
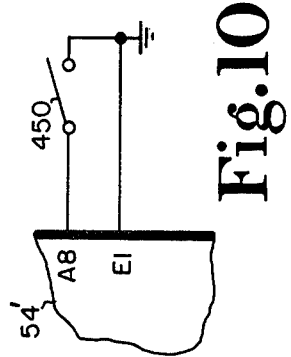
FIG. 10 is a schematic diagram of the pertinent portion of the PROM and controller circuitry for an alternative embodiment of the invention which has twenty-channel capability.

FIG. 10 shows the pertinent portion of an alternative embodiment having twenty-channel capability. All other portions of the transceiver are as previously shown and described. PROM 54' (National Semiconductor DM74S570) has a 512 words by 4 bits confiquration which provides sufficient memory space for forty 32-bit data words as required for twenty channels. Input A8, connected to switch 450, is an additional address input for determining which bank of PROM 54' is accessed. The position of switch 450 controls the input state of input A8. The addresses within each bank are determined by TALK switch 58 (FIG. 1) and CHANNEL SELECT switch 62 and counter 300 (FIG. 7) in the same manner as for the preferred embodiment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A control circuit for a radio transceiver for selectively transmitting and receiving radio communications, said circuit comprising:
   channel selection means for selecting one of a set of communication channels;
   mode control means for selecting the mode of operation of said transceiver between transmission mode and reception mode;
   a frequency synthesizer;
   a sub-audio encoder/decoder;
   memory means for storing frequency data corresponding to each of said communication channels, said frequency data for each said channel including:
     a transmission mode carrier frequency data word,
     a transmission mode tone frequency data word,
     a reception mode carrier frequency data word, and
     a reception mode tone frequency data word;
   controller means for supplying stored frequency data corresponding to the channel and mode selected on said transceiver, said controller means including means for supplying carrier frequency data words to said frequency synthesizer and means for supplying tone frequency data words to said sub-audio encoder/decoder;
   said frequency synthesizer being operative in reception mode to determine the frequency of radio communications to which said transceiver is tuned, the tuned frequency corresponding to a reception mode carrier frequency data word received from said controller means;

said frequency synthesizer being operative in transmission mode to determine the transmission frequency of radio communications transmitted by said transceiver, the transmission frequency corresponding to a transmission mode carrier frequency data word received from said controller means;

said sub-audio encoder/decoder being operative in reception mode to detect a sub-audio frequency signal on radio communications received by said transceiver, said detected sub-audio frequency being of a given frequency corresponding to a reception mode tone frequency data word received from said controller means, and to enable audio reception by said transceiver upon such detection; and said sub-audio encoder/decoder being operative in transmission mode to generate a sub-audio frequency signal corresponding to a transmission mode tone frequency data word received from said controller means, and to apply the generated sub-audio frequency signal to radio communications transmitted by said transceiver.

2. The circuit of claim 1 in which said frequency synthesizer includes a phase-locked loop.

3. The circuit of claim 1 wherein said sub-audio encoder/decoder includes a sub-audio frequency synthesizer.

4. The circuit of claim 1 wherein said frequency synthesizer and said sub-audio encoder/decoder each include data input means which are connected serially to each other and to said controller means.

5. The circuit of claim 4 wherein said serial data input means each includes a shift register.

6. The circuit of claim 1 in which said carrier frequency data words including mode control bits which signify whether said transceiver is in transmission mode or reception mode.

7. The circuit of claim 6 in which said tone frequency data words including mode control bits which signify whether said transceiver is in transmission mode or reception mode.

8. The circuit of claim 1 in which said tone frequency data words including mode control bits which signify whether said transceiver is in transmission mode or reception mode.

9. A radio transceiver for selectively transmitting and receiving radio communications, said transceiver comprising:
channel selection means for selecting one of a set of communication channels;
mode control means for selecting the mode of operation of said transceiver between transmission mode and reception mode;
radio transmission means for transmitting radio communications, said transmission means including means for converting audio into RF signals, and means for transmitting RF signals at a given frequency;
radio reception means for receiving radio communications, said reception means including tuner means for receiving RF signals at a given frequency, and audio conversion means for converting received RF signals into audio;
a frequency synthesizer;
a sub-audio encoder/decoder;
memory means for storing frequency data corresponding to each of said communication channels, said frequency data for each said channel including:
a transmission mode carrier frequency data word,
a transmission mode tone frequency data word,
a reception mode carrier frequency data word, and
a reception mode tone frequency data word;
controller means for supplying stored frequency data corresponding to the channel and mode selected on said transceiver, said controller means including means for supplying carrier frequency data words to said frequency synthesizer and means for supplying tone frequency data words to said sub-audio encoder/decoder means;
said frequency synthesizer being operative in reception mode to determine the frequency of RF signals to which said tuner means is tuned, the tuned frequency corresponding to a reception mode carrier frequency data word received from said controller means;
said frequency synthesizer being operative in transmission mode to determine the transmission frequency of RF signals transmitted by said transmission means, the transmission frequency corresponding to a transmission mode carrier frequency data word received from said controller means;
said sub-audio encoder/decoder being operative in reception mode to detect a sub-audio frequency signal on RF signals received by said transceiver, said detected sub-audio frequency being of a given frequency corresponding to a reception mode tone frequency data word received from said controller means, and to enable said audio conversion means upon such detection; and
said sub-audio encoder/decoder being operative in transmission mode to generate a sub-audio frequency signal corresponding to a transmission mode tone frequency data word received from said controller means, and to apply the generated sub-audio frequency signal to RF signals transmitted by said transmission means.

10. The circuit of claim 9 in which said frequency synthesizer includes a phase-locked loop.

11. The circuit of claim 10 wherein said sub-audio encoder/decoder includes a sub-audio frequency synthesizer.

12. The circuit of claim 11 wherein said frequency synthesizer and said sub-audio encoder/decoder each include data input means which are connected serially to each other and to said controller means.

13. The circuit of claim 12 wherein said serial data input means each includes a shift register.

14. The circuit of claim 11 in which said carrier frequency data words including mode control bits which signify whether said transceiver is in transmission mode or reception mode.

15. The circuit of claim 14 in which said tone frequency data words including mode control bits which signify whether said transceiver is in transmission mode or reception mode.

16. The circuit of claim 11 in which said tone frequency data words including mode control bits which signify whether said transceiver is in transmission mode or reception mode.

17. A control circuit for a radio transceiver for selectively transmitting and receiving radio communications, said circuit comprising:
(a) channel selection means for selecting one of a set of communication channels;

(b) mode control means for selecting the mode of operation of said transceiver between a transmission mode and a reception mode;

(c) memory means for independently storing frequency data for each of said communication channels and for each of said modes of operation for each said channel, said frequency data including carrier frequency data words and tone frequency data words;

(d) phase-locked loop (PLL) frequency synthesizer means coupled to said memory means for generating a signal corresponding to a carrier frequency data word received from said memory means, said PLL frequency synthesizer means including (1) modulation input means for receiving modulating signals;
(2) a signal output; and
(3) voltage-controlled oscillator (VCO) means operative in reception mode for generating a local oscillator signal at said signal output and operative in transmission mode for generating a frequency-modulated signal at said signal output in response to reception of modulating signals by said modulation input means;

(e) sub-audio encoder/decoder means coupled to said memory means for generating and detecting a sub-audio signal frequency corresponding to a tone frequency data word received from said memory means, said sub-audio encoder/decoder means including (1) sub-audio frequency synthesizer means operative in transmission mode for generating a sub-audio frequency modulating signal corresponding to said received tone frequency data word, said sub-audio frequency synthesizer means having an output coupled to said modulation input means of said PLL frequency synthesizer means;
(2) a signal input; and
(3) filter means operative in reception mode for generating an output signal in response to detection on said signal input of a sub-audio frequency signal corresponding to said received tone frequency data word; and (f) controller means for supplying said stored frequency data corresponding to the channel and mode selected on said transceiver, said controller means including means for supplying carrier frequency data words to said PLL frequency synthesizer means, and means for supplying tone frequency data words to said sub-audio encoder/decoder means.

18. A radio transceiver for selective transmission and reception of radio communications, said transceiver comprising:

(a) channel selection means for selecting one of a set of communication channels;

(b) mode control means for selecting the mode of operation of said transceiver, said modes of operation including a reception mode and a transmission mode;

(c) memory means for independently storing frequency data for each of said communication channels and for each of said modes of operation for each said channel, said frequency data including carrier frequency data words and tone frequency data words;

(d) phase-locked loop (PLL) frequency synthesizer means coupled to said memory means for generating a signal corresponding to a carrier frequency data word selected by said channel selection means and said mode control means, said PLL frequency synthesizer means including (1) modulation input means for receiving modulating signals;
(2) a signal output; and
(3) voltage-controlled oscillator (VCO) means operative in reception mode for generating a local oscillator signal at said signal output and operative in transmission mode for generating a frequency-modulated signal at said signal output in response to reception of modulating signals by said modulation input means;

(e) sub-audio encoder/decoder means coupled to said memory means for generating and detecting a sub-audio signal frequency corresponding to a tone frequency data word selected by said channel selection means and said mode control means, said sub-audio encoder/decoder means including (1) sub-audio frequency synthesizer means operative in transmission mode for generating a sub-audio frequency modulating signal corresponding to said selected tone frequency data word, said sub-audio frequency synthesizer means having an output coupled to said modulation input means of said frequency synthesizer means;
(2) a signal input; and
(3) filter means operative in reception mode for generating an output signal in response to detection on said signal input of a sub-audio frequency signal corresponding to said selected tone frequency data word;

(f) an antenna;

(g) RF amplifier and mixing means operative in reception mode for amplifying received RF signals and converting said signals to an intermediate frequency, said mixing means having a local oscillator input coupled to said PLL frequency synthesizer means signal output;

(h) IF amplifier and detection means operative in reception mode for amplifying and demodulating said intermediate frequency signal, said detection means having an output coupled to said signal input of said sub-audio encoder/decoder means;

(i) receiver audio amplifier means coupled to said detection means and said filter means and operative in reception mode for generating an audio output signal corresponding to said demodulated signal in response to said output signal of said filter means;

(j) speaker means coupled to said receiver audio amplifier for converting said audio output signal into sound waves;

(k) microphone means for converting sound waves into an electrical signal;

(l) transmitter audio amplifier means coupled to said microphone means and operative in reception mode for amplifying said electrical signal, said transmitter audio amplifier means being coupled to said modulation input means of said PLL frequency synthesizer;

(m) power amplifier means operative in transmission mode for amplifying said frequency-modulated signal, said power amplifier means having an input connected to said PLL frequency synthesizer means signal ouput; and (n) controller means for controlling the transfer of carrier and tone frequency data words from said memory means to said PLL frequency synthesizer and said sub-audio encoder/decoder means respectively, said controller means including means for accessing said memory means and for transferring carrier and tone frequency data words from said memory means corresponding to channel and mode selections of said channel selection means and said mode selection means.

19. The apparatus of claim 18 wherein said memory means includes serial data output means and said PLL frequency synthesizer and said sub-audio encoder/decoder means each include serial data input means, said serial data output means being serially connected to said serial data input means of said PLL frequency synthesizer and said sub-audio encoder/decoder means.

20. The apparatus of claim 19 wherein said serial data output means of said memory means is connected to said serial data input means of said PLL frequency synthesizer through said sub-audio encoder/decoder means.

21. The apparatus of claim 20 wherein each serial data input means includes a shift register.

22. The apparatus of claim 18 wherein said receiver audio amplifier is coupled to said detection means by said sub-audio encoder/decoder means and said filter means output signal corresponds to said demodulated signal, whereby said receiver audio amplifier receives said demodulated signal through said filter means when said filter means generates said output signal.

23. A radio transceiver comprising:
    (a) channel selection means for selecting one of a set of communication channels;
    (b) mode control means for selecting the mode of operation of said transceiver, said modes of operation including a reception mode and a transmission mode;
    (c) audio conversion means for converting demodulated radio signals into audio;
    (d) microphone means for converting audio into an electrical signal;
    (e) an RF amplifier;
    (f) an antenna;
    (g) memory means for storing frequency data for each of a plurality of communication channels, said frequency data for each channel including transmission mode carrier frequency data words and tone frequency data words and separate reception mode carrier frequency data words and tone frequency data words;
    (h) phase-locked loop frequency synthesizer means for generating a signal in response to reception of a carrier frequency data word, said frequency synthesizer means including means for receiving said carrier frequency data word and means for receiving modulating signals, said frequency synthesizer means further including means for generating a local oscillator signal in reception mode and means for generating a frequency-modulated signal in transmission mode;
    (i) sub-audio encoder/decoder means for encoding and decoding sub-audio signal frequencies, said sub-audio encoder/decoder means including
        (1) means for receiving a tone frequency data word;
        (2) sub-audio frequency synthesizer means for generating a sub-audio frequency signal corresponding to said tone frequency data word; and
        (3) filter means for coupling demodulated received radio signals to said audio amplifier means in response to detection of a sub-audio frequency signal corresponding to said tone frequency data word; and
    (j) controller means for transferring said carrier and tone frequency data words from said memory means to said frequency synthesizer and said sub-audio encoder/decoder means respectively, said controller means including means for accessing said memory means and for transfering carrier and tone frequency data words from said memory means corresponding to channel and mode selections of said channel selection means and said mode selection means.

24. The circuit of claim 23 in which said memory means includes a programmable read only memory (PROM).

* * * * *